(No Model.)
H. WOODWARD.
SECONDARY BATTERY.
No. 434,224. Patented Aug. 12, 1890.
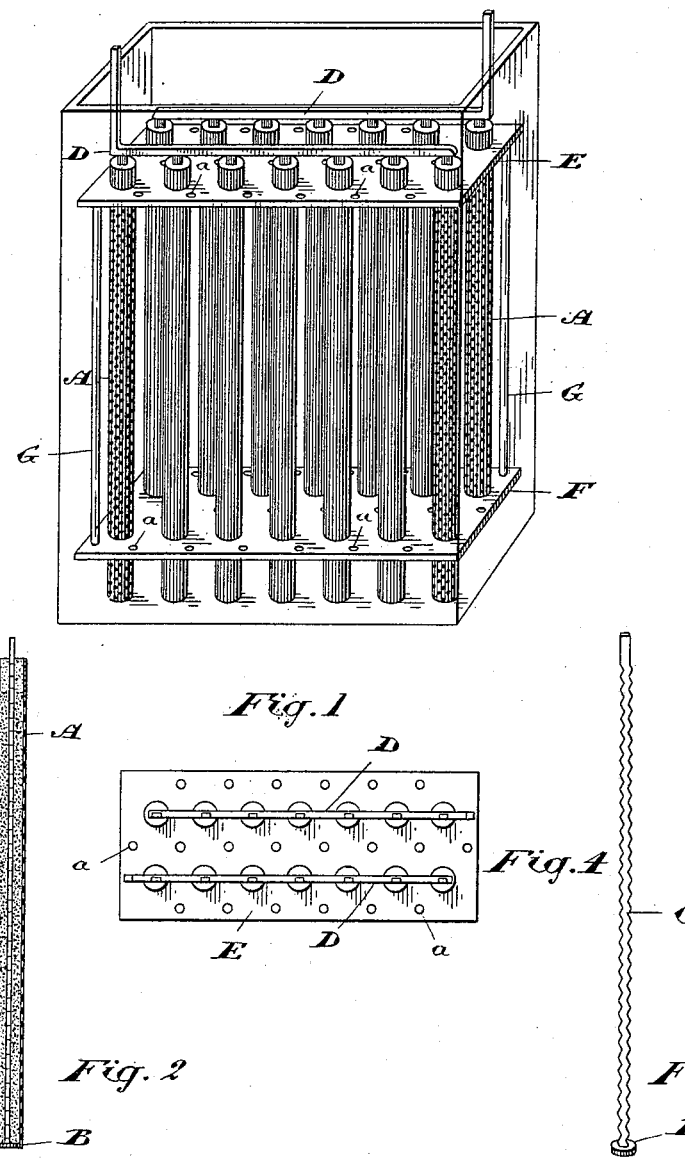
Witnesses
J. Edw. Maybee
J. R. Cameron
Inventor
Henry Woodward
by Donald C. Ridout & Co.
Attys

UNITED STATES PATENT OFFICE.

HENRY WOODWARD, OF TORONTO, CANADA.

SECONDARY BATTERY

SPECIFICATION forming part of Letters Patent No. 434,224, dated August 12, 1890.

Application filed April 11, 1890. Serial No. 347,457. (No model.)

*To all whom it may concern:*

Be it known that I, HENRY WOODWARD, electrician, of the city of Toronto, in the county of York, in the Province of Ontario, Canada, have invented a certain new and useful Improvement in Secondary Batteries, of which the following is a specification.

The object of the invention is to produce a practically indestructible secondary battery; and it consists, essentially, in forming each electrode of a series of cylindrical or otherwise-shaped perforated tubes made of vulcanized rubber or other acid-proof non-conducting material, the said tubes being passed through one or more holders or separators made of vulcanized rubber or other acid-proof non-conducting material, by which they are held at a fixed distance apart. Each tube contains a spindle or stem surrounded with lead filings, shavings, or other small pieces of lead or alloy of lead, the upper ends of each spindle being attached to a horizontal lead connector, and two or more of the electrodes so constructed are placed in a cell preferably made of glass and containing the ordinary solution of sulphuric acid, substantially as hereinafter more particularly explained.

Figure 1 is a perspective view of my improved secondary battery. Fig. 2 is a sectional view of one of the tubes. Fig. 3 is a view of one of the spindles. Fig. 4 is a plan showing the tubes arranged in the holder or separator.

In the drawings, A represents the tube, which I show cylindrical in form, although it will of course be understood that the said tube or tubes may be made any desired shape. Each tube is perforated, although only a few are so indicated in the drawings. These tubes I make of vulcanized rubber, or of any other acid-proof non-conducting material. The bottom of each tube A is closed by a disk or plug B, made to fit the said tube tightly, to which it is otherwise permanently fixed.

C is a spindle or stem fixed to the disk or plug B and extending through the opposite end of its tube A. This spindle or stem I make of lead or an alloy of lead, and prefer to either corrugate it, as shown in Fig. 3, or form it into a spiral shape. The end of each of the spindles or stems C is fixed to the horizontal lead bar or connector D. The interior of each tube A is filled with lead filings or chips, and the interior of each tube A may be lined with lead perforated to correspond with the perforations in the outer skin of the said tube.

It will be observed that each tube A is passed through holes in the separators or holders E and F, which are made of vulcanized rubber or any other suitable acid-proof non-conducting material. The separators E and F are connected together and held apart by posts G, made of vulcanized rubber or any other suitable acid-proof non-conducting material. A series of perforations $a$ are made through each separator E and F to permit the escape of the gas generated within the cell. From this description it will be seen that as each electrode is composed of a series of tubes permanently held apart and separated by non-conducting material there can be no buckling of the electrodes, nor can they come in contact with each other so as to cause short-circuiting in the battery.

For the purpose of hastening the formation of the electrodes I saturate the lead filings referred to in nitric acid or other chemical reagent until partially reduced. The filings are then strained and filled into the tubes. The formation can be still further quickened by adding a small quantity of sulphate of soda or magnesia.

What I claim as my invention is—

1. An electrode for a secondary battery, comprising one or more holders or separators made of vulcanized rubber or other acid-proof non-conducting material, and a series of cylindrical or otherwise-shaped perforated tubes made of vulcanized rubber or other acid-proof non-conducting material, the said tubes being passed through said holder or holders, each tube containing a spindle or stem surrounded with lead filings, shavings, or other small pieces of lead or alloy of lead, the upper ends of each spindle being attached to a horizontal lead connector, and two or more of the electrodes so constructed placed in a cell preferably made of glass and containing the ordinary solution of sulphuric acid, substantially as and for the purpose specified.

2. An electrode for a secondary battery, comprising one or more holders or separators made of vulcanized rubber or other acid-proof non-conducting material, and a series of cylindrical or otherwise-shaped perforated tubes made of vulcanized rubber or other acid-proof non-conducting material lined with lead, likewise perforated, the said tubes being passed through said holder or holders, each tube containing a spirally-shaped or corrugated spindle or stem surrounded with lead filings, shavings, or other small pieces of lead or alloy of lead, the upper ends of each spindle being attached to a horizontal lead connector, and two or more of the electrodes so constructed placed in a cell preferably made of glass and containing the ordinary solution of sulphuric acid, substantially as and for the purpose specified.

Toronto, March 12, 1890.

HENRY WOODWARD.

In presence of—
CHARLES C. BALDWIN,
E. CUMMINGS.